United States Patent
Zhu et al.

(10) Patent No.: US 12,011,040 B2
(45) Date of Patent: Jun. 18, 2024

(54) NON-CONTACT HEAT-NOT-BURN HEATING DEVICE

(71) Applicant: XIAMEN FENGTAO CERAMICS CO., LTD., Xiamen (CN)

(72) Inventors: Xiaohua Zhu, Xiamen (CN); Zhaorong Xiong, Xiamen (CN); Zengxue Fu, Xiamen (CN); Xiangyi Yu, Xiamen (CN); Maoqi Liu, Xiamen (CN)

(73) Assignee: XIAMEN FENGTAO CERAMICS CO., LTD., Xiamen (CN)

( * ) Notice: Subject to any disclaimer, the term of this patent is extended or adjusted under 35 U.S.C. 154(b) by 470 days.

(21) Appl. No.: 17/519,553

(22) Filed: Nov. 4, 2021

(65) Prior Publication Data
US 2022/0053833 A1 Feb. 24, 2022

Related U.S. Application Data

(63) Continuation of application No. PCT/CN2020/090251, filed on May 14, 2020.

(30) Foreign Application Priority Data

May 16, 2019 (CN) .......................... 201920703370.X
Sep. 10, 2019 (CN) .......................... 201910850981.1
Sep. 10, 2019 (CN) .......................... 201921496546.5

(51) Int. Cl.
*A24F 40/46* (2020.01)
*A24D 3/17* (2020.01)
(Continued)

(52) U.S. Cl.
CPC ................ *A24F 40/46* (2020.01); *A24D 3/17* (2020.01); *A24F 40/20* (2020.01); *A24F 40/485* (2020.01); *A24F 40/51* (2020.01); *A24F 40/53* (2020.01); *A24F 40/57* (2020.01); *H05B 3/141* (2013.01); *H05B 3/46* (2013.01); *H05B 3/48* (2013.01);
(Continued)

(58) Field of Classification Search
None
See application file for complete search history.

(56) References Cited

FOREIGN PATENT DOCUMENTS

| CN | 205585323 U | 9/2016 |
|---|---|---|
| CN | 205728062 U | 11/2016 |

(Continued)

*Primary Examiner* — Ross N Gushi
(74) *Attorney, Agent, or Firm* — Bayramoglu Law Offices LLC

(57) ABSTRACT

A non-contact heat-not-burn heating device includes a ceramic heating element, a smoking product bearing assembly and a sealing sleeve; the sealing sleeve is arranged in the hollow mode to sleeve the ceramic heating element and the smoking product bearing assembly inside, and the ceramic heating element and the smoking product bearing assembly are mutually separated. The ceramic heating element includes a heating body and a heating circuit, the heating body is cylindrical and internally provided with a porous channel, and the heating circuit is arranged on the heating body to heat the air passing through the porous channel. The smoking product bearing assembly includes a ceramic tube and a blocking piece; a cavity defined by the ceramic tube is suitable for placing a smoking product, and the blocking piece is connected to the ceramic tube and adjacent to the ceramic heating element to limit the position of the smoking product.

18 Claims, 7 Drawing Sheets

(51) Int. Cl.
    *A24F 40/20*     (2020.01)
    *A24F 40/485*     (2020.01)
    *A24F 40/51*     (2020.01)
    *A24F 40/53*     (2020.01)
    *A24F 40/57*     (2020.01)
    *H05B 3/14*     (2006.01)
    *H05B 3/46*     (2006.01)
    *H05B 3/48*     (2006.01)

(52) U.S. Cl.
    CPC .. *H05B 2203/013* (2013.01); *H05B 2203/017* (2013.01)

(56) References Cited

FOREIGN PATENT DOCUMENTS

| | | |
|---|---|---|
| CN | 206776746 U | 12/2017 |
| CN | 207151944 U | 3/2018 |
| CN | 208338876 U | 1/2019 |
| CN | 110710722 A | 1/2020 |
| JP | 3132085 U | 5/2007 |

NON-CONTACT HEAT-NOT-BURN HEATING DEVICE

CROSS REFERENCE TO THE RELATED APPLICATIONS

This application is a continuation application of International Application No. PCT/CN2020/090251, filed on May 14, 2020, which is based upon and claims priority to the Chinese Patent Application No. 201920703370.X, filed on May 16, 2019, the Chinese Patent Application No. 201921496546.5, filed on Sep. 10, 2019, and the Chinese Patent Application No. 201910850981.1, filed on Sep. 10, 2019, the entire contents of which are incorporated herein by reference.

TECHNICAL FIELD

The present invention relates to the technical field of heat-not-burn products, and in particular to a non-contact heat-not-burn heating device.

BACKGROUND

Smoking products such as cigarettes and cigars produce smoke by burning tobaccos during use, while the smoke produced by burning of the tobaccos contains many harmful substances, like tar, and inhalation of these harmful substances for a long term will cause great harm to the human body. With the progress of science and technology and continuous pursuit of a healthy life by people, a cigarette substitute, namely a heat-not-burn product, has emerged. Among them, a typical heat-not-burn scheme is to release effective substances in the smoking products in the heat-not-burn mode, like nicotine.

The heat-not-burn product mainly uses a working principle of low-temperature heating to heat the smoking products to about 300° C., thereby baking out effective ingredients like the nicotine in the smoking products. Because the burning temperature is not reached, the harmful substances like the tar in the smoking products are greatly reduced.

In the related art, the heat-not-burn product generally adopts a contact heating scheme to bake the smoking products, for example, a sword-shaped needle-shaped heating element is inserted into the smoking products for heating. However, the contact heating scheme has the shortcoming of uneven heating, that is, the part in direct contact with the heating element has a higher temperature, while the part far away from the heating element has rapid temperature decrease. Therefore, only the part of the tobacco close to the heating element can be completely baked, leading to the fact that the cut tobacco in the smoking products cannot be completely baked, and not only the cut tobacco is wasted, but also the smoke volume is wasted. If the baking efficiency is improved by increasing the temperature of the heating element, the cut tobacco around the heating element can be easily burnt, which not only affects the taste, but even leads to a large increase in the harmful ingredients and affects physical health.

SUMMARY

The present invention is made based on knowledge and research of the inventor on the following issues:

In the working process of a heat-not-burn product, due to the fact that the contact heating scheme has the shortcoming of uneven heating, the smoking products cannot be completely baked, and not only the cut tobacco is wasted greatly, but also the smoke volume is insufficient.

For this purpose, after a lot of research and experiments, the inventor finds that the smoking process itself is an air flow process. If the air flowing into the smoking products has the higher temperature, the hot air can play a direct role in baking the smoking products. Since the hot air can penetrate and bake all the tobacco of the smoking products with the smoking process, the problem of uneven heating can be effectively solved. Therefore, the smoking product is baked by heating the air and then using the hot air flow during the smoking process to achieve heating, and this scheme can achieve good overall heating effect.

The present invention aims to solve one of the technical problems in the above art at least to some extent. For this purpose, an objective of the present invention is to provide a non-contact heat-not-burn heating device which heats air through a ceramic heating element to make the heated flow air bake the smoking product evenly, avoid cut tobacco waste of the smoking product and improve the smoke volume.

To achieve the foregoing objective, an embodiment of the present invention provides a non-contact heat-not-burn heating device which comprises a ceramic heating element, a smoking product bearing assembly and a sealing sleeve, wherein the sealing sleeve is arranged in the hollow mode to sleeve the ceramic heating element and the smoking product bearing assembly inside, and the ceramic heating element and the smoking product bearing assembly are mutually separated. The ceramic heating element comprises a heating body and a heating circuit, the heating body is cylindrical and internally provided with a porous channel, and the heating circuit is arranged on the heating body to heat the air passing through the porous channel. The smoking product bearing assembly comprises a ceramic tube and a blocking piece, wherein a cavity defined by the ceramic tube is suitable for placing the smoking product, and the blocking piece is connected to the ceramic tube and adjacent to the ceramic heating element to limit the position of the smoking product.

According to the non-contact heat-not-burn heating device of the embodiment of the present invention, the ceramic heating element and the smoking product bearing assembly are separated in the sealing sleeve, so that the heated flow air can bake the smoking product evenly when the ceramic heating element heats the air, which avoids cut tobacco waste of the smoking product and improves the smoke volume. Meanwhile, due to the fact that the ceramic heating element adopts the high-purity aluminum oxide ceramics which have high compactness and almost have no pores in the micro-structure, pollutants in fluids cannot enter the ceramic heating element and thus cannot leave pollution or peculiar smell on the surface. Further, because the smoking product bearing assembly separates the smoking product from the ceramic heating element completely, non-contact air heating is completely achieved to ensure that the product is not polluted. In addition, the ceramic heating element adopts the porous arrangement, so that the specific surface area of the honeycomb ceramic body is large enough to achieve sufficient heating of the air. Not only the heating efficiency is high, but also the ceramic heating body has high thermal conductivity, so that the aim of heating the air can be achieved more quickly. Further, the air flow speed is limited to some extent due to the structure of the porous channel, the contact time between the hot air and the smoking product is longer during baking of the smoking product, the heat loss is reduced, and the energy is saved.

Moreover, when no smoking action is performed, the hot air can be locked by means of the porous shape of the ceramic heating body, which reduces outer flow of the hot air and further saves the energy. Furthermore, in the smoking product bearing assembly, the cavity defined by the ceramic tube is used for placing the smoking product, and the blocking piece is used for separating the smoking product placed in the cavity from the ceramic heating element, which prevents the ceramic heating element from being in direct contact with the smoking product or being too close to the smoking product to further effectively prevent the part of the smoking product close to the ceramic heating element from being heated to be over 320° C. and burnt. Further, when a user smokes the smoking product, the hot air flows into the cavity quickly to bake the smoking product evenly and quickly to ensure that the hot air heated by the ceramic heating element bakes the smoking product effectively, the baking efficiency is high, and the smoke volume is sufficient. Due to the fact that the ceramic tube has high surface compactness, adsorption of the smoke particles can be effectively prevented, and the effect of preventing peculiar smell can be achieved.

Moreover, the non-contact heat-not-burn heating device provided according to the above embodiment of the present invention can further have the following additional technical characteristics:

Further, the heating body is a cylinder, and the porous channel is arranged in the heating body in the axial direction.

Specifically, through holes of the porous channel are round holes or polygonal holes.

Specifically, the through holes of the porous channel are regularly distributed in the heating body.

Wherein, the hole diameter of the through holes can be 0.1-2 mm, and the distance between two adjacent through holes can be 0.1-0.5 mm.

Optionally, the heating circuit is printed on the outer surface of the heating body in the thick film circuit mode.

Optionally, the blocking piece is a flow deflector located on an opening at one end of the ceramic tube and forming a cup body with the ceramic tube, and the flow deflector is provided with a plurality of deflector holes.

Wherein, the plurality of deflector holes are evenly distributed in the peripheral direction.

Optionally, the deflector holes are round holes with the hole diameter of 0.1-2 mm.

Optionally, the blocking piece forms a step surface extending along the wall of the ceramic tube to the center.

Specifically, two blocking pieces are provided, and the two blocking pieces are arranged oppositely.

Further, the heating body and the ceramic tube are both made of aluminum oxide ceramics, aluminum nitride ceramics, silicon nitride ceramics, silicon carbide ceramics, beryllium oxide ceramics or zirconium oxide ceramics.

Specifically, the aluminum oxide content in the aluminum oxide ceramics is greater than 99%, and the density of the aluminum oxide ceramics is not less than 3.86 g/cm$^3$.

In addition, the embodiment of the present invention further provides a non-contact air heating type heat-not-burn heating device which comprises a heating assembly, a sealing sleeve and a heat recovery device, wherein the side wall of the heat recovery device is internally provided with a first cellular porous channel, and the first cellular porous channel divides the heat recovery device into an outer wall and an inner wall; the inner wall of the heat recovery device is provided with the sealing sleeve, the sealing sleeve is internally provided with the heating assembly in the sleeve mode, and the heating assembly is connected to the heat recovery device through the sealing sleeve; the heating assembly is internally provided with a heating body; and the heating body is provided with a heating circuit, the endpoints of the heating circuit are provided with wires, and the heating body is internally provided with a second cellular porous channel.

Further, the heating assembly is provided with a preheating tube, a flow deflector and a heating element sequentially from top to bottom, wherein the flow deflector is provided with a plurality of deflector holes.

Further, the heating assembly and the heat recovery device are both made of the high-purity aluminum oxide ceramics with the density not less than 3.86 g/cm$^3$.

Further, the first cellular porous channel and the second cellular porous channel are provided with square holes or other polygonal holes evenly distributed, the hole diameter range is 0.1-2 mm, and the minimum distance between two adjacent holes is 0.1-0.5 mm.

Further, printing materials of the heating circuit comprise but not limited to silver, tungsten and MoMn (molybdenum manganese).

Further, materials of the wires comprise but not limited to silver, copper and nickel.

The non-contact air heating type heat-not-burn heating device of the embodiment of the present invention heats the air through the heating assembly to make the heated flow air bake the tobacco evenly and improve the smoke volume. Meanwhile, due to the fact that the heating assembly and the heat recovery device both adopt the high-purity aluminum oxide ceramics which have high compactness and almost have no pores in the micro structure, the pollutants in the fluids cannot enter the ceramics and cannot leave pollution or peculiar smell on the surface. Further, due to the air heating mode, no contact with a cartridge ensures that the device is not polluted.

DETAILED DESCRIPTION OF THE EMBODIMENTS

Figure 1:
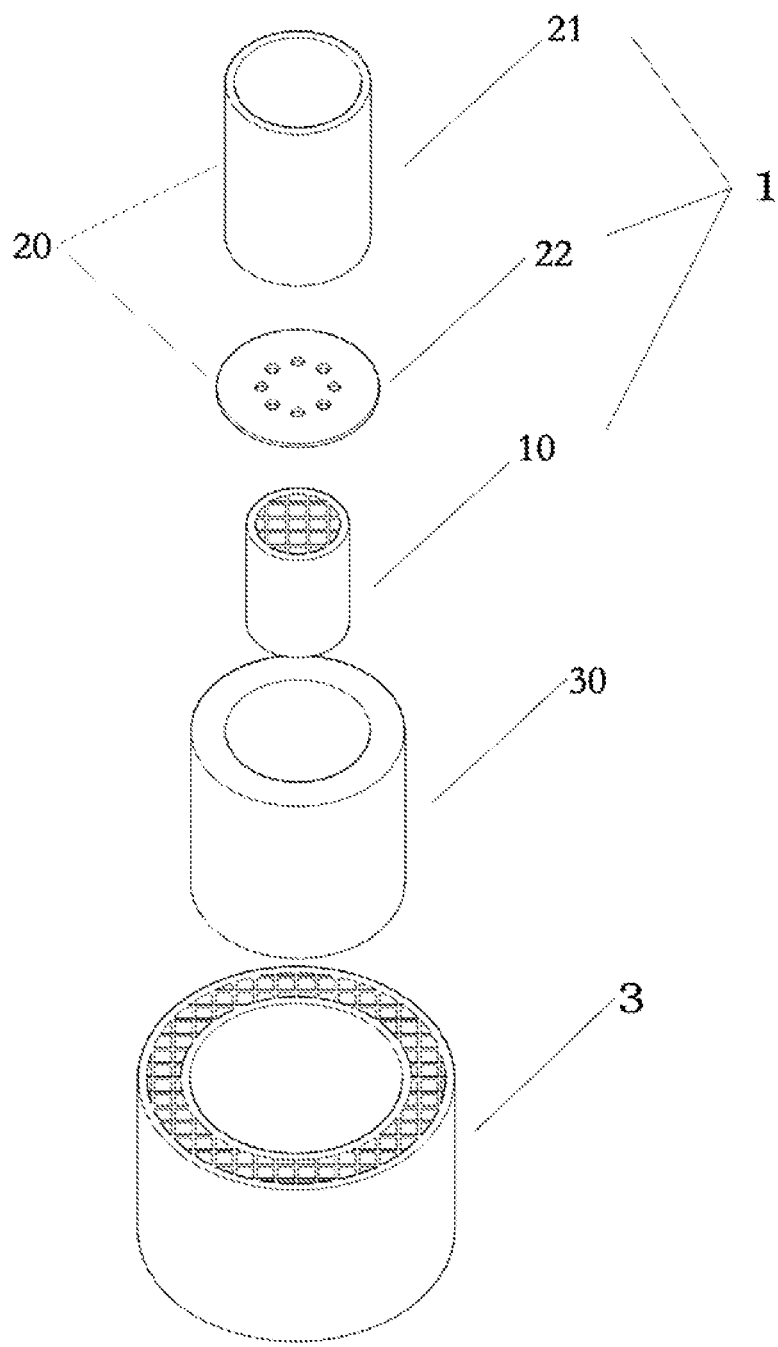
FIG. 1 is a structure diagram of a non-contact air heating type heat-not-burn heating device of embodiment of the present invention.

The embodiments of the invention will be described in detail below, examples of the embodiments are shown in drawings, wherein same or similar mark numbers indicate identical or similar components or components having same or similar functions. The embodiments described with reference to the drawings below are illustrative and intended to explain the present invention and cannot be construed as limiting the present invention.

In order to better understand the above technical scheme, the illustrative embodiments of the present invention are described in more detail with reference to the drawings below. Although the drawings show the illustrative embodiments of the present invention, it should be understood that the present invention can be achieved in various forms without being limited by the embodiments illustrated. On the contrary, these embodiments are provided to understand the present invention more thoroughly, and can convey the scope of the present invention to those skilled in the art completely.

In order to better understand the above technical scheme, the above technical scheme will be described in detail in combination with the specification drawings and the specific embodiments below.

First, after a lot of research and experiments, the inventor of the present invention finds that the heating scheme of heating the air and utilizing the hot air to bake the smoking product in the smoking process is better in heating effect on the whole.

However, when the air heating scheme is adopted, first it is necessary to select a suitable heating element to heat the air, and when the heating element heats the air, room temperature air needs to enter the heating element, and the temperature of air should reach 300° C. or above after flowing out of the heating element; second, some general smoking habits have to be considered, that is, about 20 ml per second must be ensured during temperature rise, and each puff lasts for about 3 seconds, and the heating element needs a total heating efficiency of about 60 ml air.

To achieve the above effect, the inventor has learned through a lot of experiments that when a heating wire is used to heat the air, the heating wire should have high temperature, and only when the temperature of the heating wire is up to 600° C. or above, it can heat the air flowing through to more than 300° C., and the heating wire will cool quickly as long as air flows by, in this way, each puff of smoking will make the temperature of the heating wire drop by 200-300° C. Therefore, the heating wire needs power compensation during smoking, otherwise it may be difficult to guarantee air heating required for smoking; while, power compensation is performed for the heating wire based on the air flow detected by an air flow sensor, due to small contact area between heating wire and air, this power compensation scheme not only needs high power to achieve the required heating effect, but also has the problem of inaccurate gas temperature after heating, untimely compensation response, which may cause uneven temperature in all directions.

In addition, when the flow air is heated to above 300° C. by increasing the temperature of a heater strip, metal ions separated from the heater strip may be mixed into the smoking airflow and enter the human body to do harm to the body health due to temperature increase of the heater strip and direct contact of the heater strip with the air.

For the above, the inventor of the present invention has concluded through a lot of research that when air heating is used to bake a smoking product, the heating element used to heat the air needs to have a large heating area so as to reduce the temperature difference between the heating element and the air; the heating element also needs high heat capacity to resist against the temperature drop caused after the smoking airflow passes, and high thermal conductivity to reduce the heating preparation time.

For this purpose, the applicant finds based on in-depth research on ceramics for years that a larger heating surface area can be obtained by designing a porous structure of the honeycomb ceramics, so that the heating element will have a high air heating efficiency, and the honeycomb ceramic heating element of porous structure is closer to a solid structure and has a higher heat capacity than a ceramic tube of the same size; in addition, the thermal conductivity of alumina material is greater than 30 W/MK, which can make the heat conduction faster and more uniformly, thereby obtaining high thermal conductivity. Therefore, the honeycomb ceramic heating element of porous structure can meet the requirement of baking the smoking product by heating air.

A non-contact heat-not-burn heating device of the embodiment of the present invention is described below with reference to the drawings.

Figure 7:
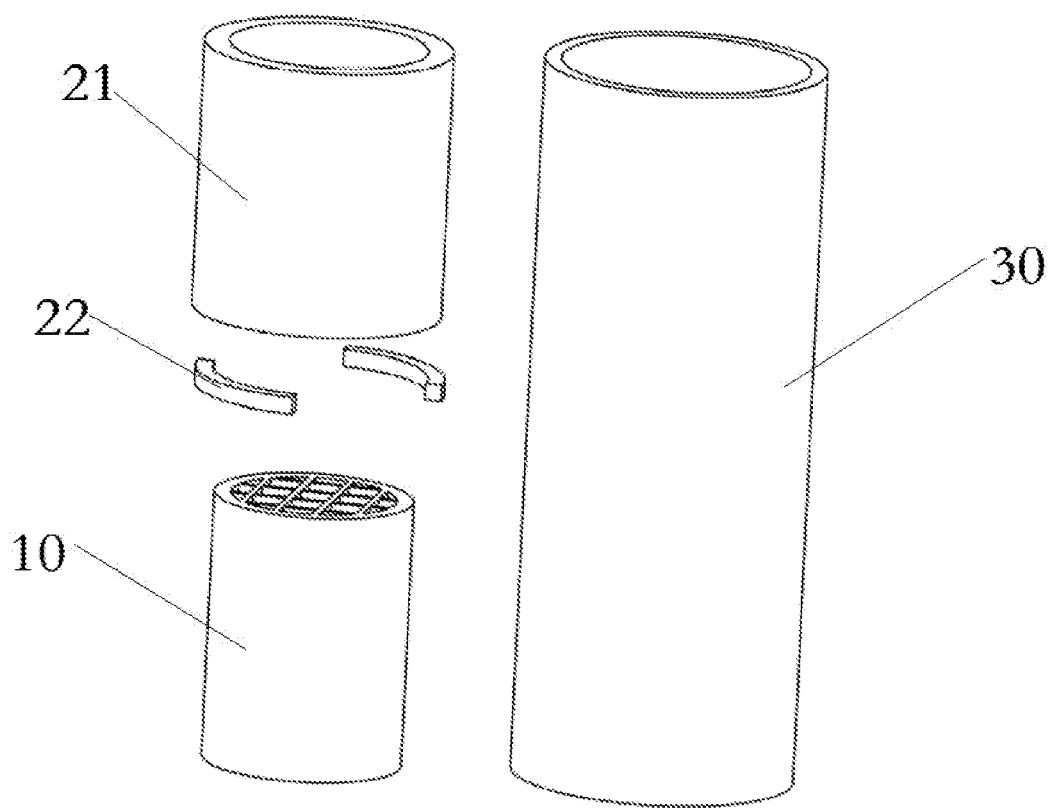
FIG. 7 is a structure diagram of a non-contact air heating type heat-not-burn heating device of another embodiment of the present invention.

As shown in FIG. 1 and FIG. 7, the non-contact heat-not-burn heating device of the embodiment of the present invention comprises a ceramic heating element 10, a smoking product bearing assembly 20 and a sealing sleeve 30, wherein the sealing sleeve 30 is arranged in the hollow mode to sleeve the ceramic heating element 10 and the smoking product bearing assembly 20 inside, and the ceramic heating element 10 and the smoking product bearing assembly 20 are mutually separated.

Figure 2:
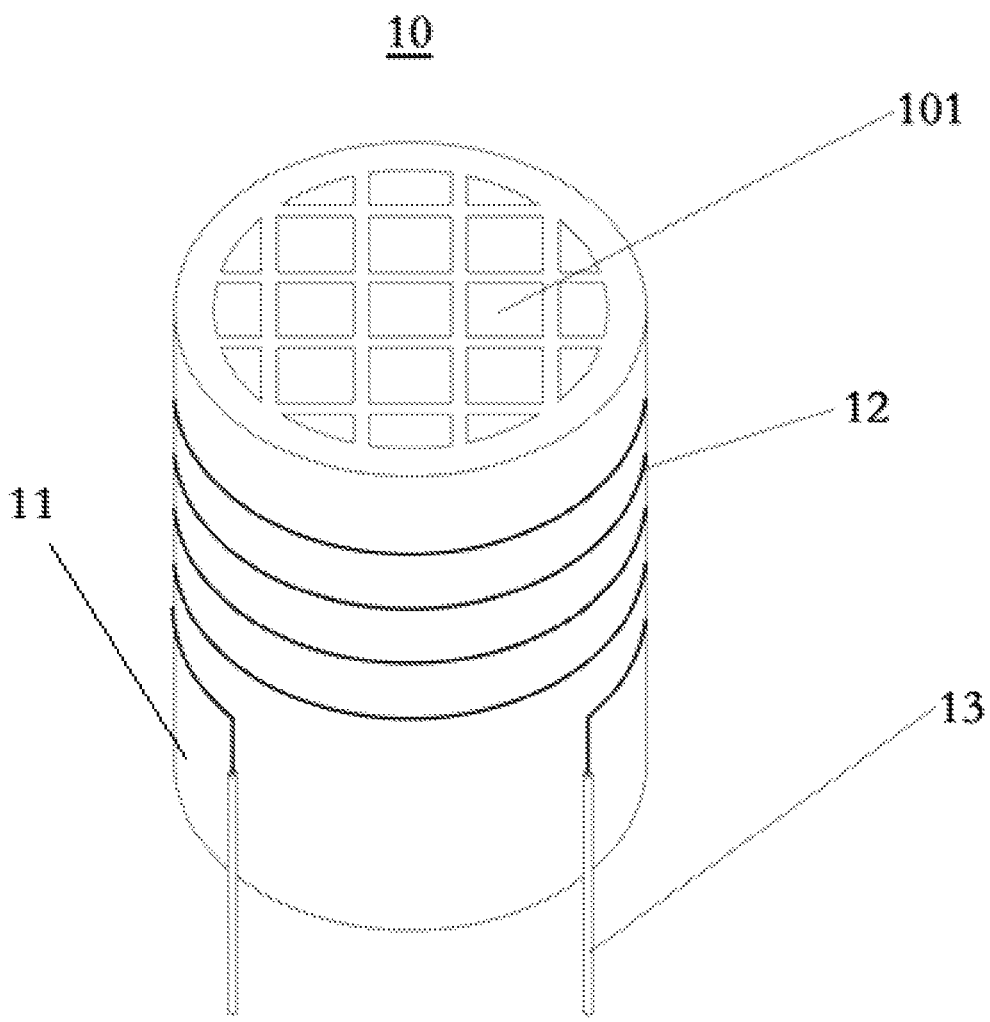
FIG. 2 is a schematic diagram of a ceramic heating element of an embodiment of the present invention.

Further, as shown in FIG. 1 and FIG. 2, the ceramic heating element 10 comprises a heating body 11 and a heating circuit 12.

Wherein, the heating body 11 is cylindrical, and the heating body 11 is internally provided with a porous channel 101; and the heating circuit 12 is arranged on the heating body 11 to heat air passing through the porous channel 101.

That is, the heating circuit 12 performs heating work after powered on to heat the air passing through the porous channel 101 to achieve the function of even heating of the air.

Optionally, the heating body 11 can be cylindrical and can also be in the shape of a polygonal cylinder, such as in the shape of a prism, a square column, a pentagonal column, etc. This is not specifically limited in the present invention.

In an embodiment, as shown in FIG. 2, the heating body 11 is a cylinder, and the porous channel 101 is arranged in the heating body 11 in the axial direction.

In addition, as shown in FIG. 2, the heating circuit 12 is printed on the outer surface of the heating body 11 in the thick film circuit mode. For example, the heating circuit encircles the outer surface of the heating body 11 in the heating coil mode and is integrated with the heating body 11.

According to an embodiment of the present invention, printing materials of the heating circuit 12 comprise silver, tungsten or molybdenum manganese.

Specifically, the outer wall of the cylindrical cellular ceramic heating body is printed with the heating silver paste thick film heating circuit for heating. Due to the fact that the ceramic heating body 11 adopts the porous cellular structure, the heating surface area of the heating element can be greatly increased. According to experiments, the user only needs to heat the heating body 11 to about 380° C. to heat the air to above 300° C. Because the ceramic heating body 11 has higher heat capacity, after each smoking airflow (for example, 50 ml air) passes through the ceramic heating element, temperature decrease is small, only 20-30° C.

When the heating circuit 12 is printed on the outer surface of the heating body 11 in the thick film circuit mode, its heating resistor is generally a PTC thermistor, that is, the resistance increases when the temperature rises. According to multiple temperature increase and decrease experiments, the temperature of the ceramic heating element corresponds to the resistance, so that the temperature of the ceramic heating element can be represented by measuring the resistance. Thus, the temperature of the heating element can be pulled back to the original temperature within several seconds by utilizing the self-compensation effect (the heating element is cooled, the resistance decreases, the current increases, and the power increases) of the thick film heating circuit under constant voltage supply of a DC power supply, and the temperature of the heating element can be kept stable without fluctuations when there is no airflow.

Therefore, in the embodiment of the present invention, due to the cellular structure of the heating body 11, the ceramic heating element can provide sufficient heat capacity, so that the temperature effect of the airflow on the heating element is very small in the simulated smoking process, no power compensation is required, and the effect of the heating air for cigarette smoking can be achieved by self-regulation.

In addition, the heating circuit 12 printed on the heating body 11 in the thick film circuit mode has a clear temperature-sensitive effect. The resistance increases with increase of the temperature and decreases with decrease of the temperature, the heating circuit can be used as a sensor, so no temperature sensor is required to control the temperature of the heating element.

To sum up, the ceramic heating element of the embodiment of the present invention does not need to perform dynamic power compensation based on an airflow sensor, nor does it need to detect or control the temperature based on a temperature sensor, which not only simplifies the complexity of a control system, but also achieves a better control response effect.

Optionally, according to an embodiment of the present invention, through holes of the porous channel 101 are round holes or polygonal holes.

In addition, in an embodiment, the through holes of the porous channel 101 are regularly distributed in the heating body 11, for example, as shown in FIG. 2.

Optionally, when the heating body 11 is a cylinder, the through holes of the porous channel 101 can be evenly distributed in the peripheral direction. Or, as shown in FIG. 2, when the through holes of the porous channel 101 are polygonal holes, the through holes can be distributed in the cylinder in central symmetry.

Understandably, in the embodiment of the present invention, the distribution of the through holes of the porous channel 101 may not be limited, as long as the porous cellular structure of the heating body 11 is limited.

Specifically, in an embodiment of the present invention, the hole diameter of the through holes of the porous channel 101 is 0.1-2 mm, for example, 0.5 mm and 1 mm; and the distance between two adjacent through holes is 0.1-0.5 mm, for example, 0.2 mm and 0.4 mm. Understandably, the hole diameter of the through holes of the porous channel 101 and the distance between two adjacent through holes can be limited according to the specific circumstances of the heating body 11, as long as ventilation can be performed to increase the contact area between the air and the surface.

Optionally, according to an embodiment of the present invention, the heating body 11 is made of aluminum oxide ceramics, aluminum nitride ceramics, silicon nitride ceramics, silicon carbide ceramics, beryllium oxide ceramics or zirconium oxide ceramics.

Wherein, the aluminum oxide content in the aluminum oxide ceramics is greater than 99%, and the density of the aluminum oxide ceramics is not less than 3.86 g/cm$^3$.

Specifically, in an example, as shown in FIG. 2, the ceramic heating element comprises the cellular heating body 11 made of the aluminum oxide ceramics, the heating circuit 12 and wires 13. Wherein, the center of the cellular heating body 11 is provided with the porous channel 101, the porous channel 101 is provided with square holes evenly distributed, the heating circuit 12 is arranged on the outer surface of the heating body 11 in the encircling mode, and the head end and the tail end of the heating circuit 12 are provided with the wires 13.

In addition, the density of the aluminum oxide ceramics of the heating body 11 is 3.9 g/cm$^3$, and the resistance of the heating body 11 can be 0.1-2Ω, for example, 0.6Ω and 0.8Ω; the hole diameter of the square holes of the porous channel 101 can be 1.5 mm, that is, the side length of the square holes is 1.5 mm; and the wall thickness of the porous channel 101 can be 0.2 mm, as shown in FIG. 2, the distance between corresponding sides of two adjacent square holes is the wall thickness of the porous channel 101.

Further, the material of the heating circuit 12 can be silver. Wherein, the printing thickness of the heating circuit 2 is 0.01-0.02 mm, the wires 13 can be silver wires, and the diameter is 0.2 mm.

In the embodiment of the present invention, the purity of the aluminum oxide ceramics for making the heating body 11 is greater than 99%, that is, the ceramics are high-purity aluminum oxide ceramics, the cellular ceramic surface has very high compactness, adsorption of the smoke particles can be effectively prevented, and the effect of preventing peculiar smell can be achieved. The cellular heating body made of the high-purity aluminum oxide ceramics has good thermal conductivity, up to 33 W/MK. The wall thickness and the hole diameter are both very small in the structure of the cellular ceramic heating element, and the heat conduction effect is extremely good. Meanwhile, the contact area with the air can be greatly increased by means of the cellular shape, so that the specific surface area of the honeycomb aluminum oxide ceramics is large, the heating efficiency is high, and the aim of heating the air can be achieved more quickly. In this way, the cellular ceramic heating element of the embodiment of the present invention is arranged under a smoking product to be baked and not in direct contact with the smoking product to be baked. When a user smokes the smoking product, the air flows through the through holes of the heating element honeycomb to be heated to the specific temperature, then the smoking product is quickly heated to about 320° C. when the hot air flows through the smoking product, the heating area and the heating efficiency of the smoking product are greatly improved, the heating is more even, the cut tobacco is carbonized more completely, cut tobacco waste is avoided, the taste of the user is improved, the smoke volume is sufficient, and the effect is not limited by the variety of the smoking product. Further, the air flow speed is limited to some extent due to the structure of the porous honeycomb, the contact time between the hot air and the smoking product is longer, heat loss is reduced, and energy is saved. When there is no smoking action, the porous honeycomb ceramic can lock the hot air while reducing the outflow of hot air, which will further save energy.

To sum up, according to the ceramic heating element of the embodiment of the present invention, the heating body is internally provided with the porous channel, so that the contact area between the heating body and the air can be increased when the air passing through the porous channel is heated by the heating circuit, which makes the specific surface area of the honeycomb ceramic body large and achieves sufficient heating of the air. Not only the heating efficiency is high, but also the ceramic heating body has high thermal conductivity, so that the aim of heating the air can be achieved more quickly. Further, the air flow speed is limited to some extent due to the structure of the porous channel, the contact time between the hot air and a smoking product is longer during baking of the smoking product, heat loss is reduced, and energy is saved. Moreover, when no smoking action is performed, the hot air can be locked by means of the porous shape of the ceramic heating body, which reduces outer flow of the hot air and further saves the energy. In addition, due to the fact that the ceramic heating body has high surface compactness, adsorption of the smoke particles can be effectively prevented, and the effect of preventing peculiar smell can be achieved.

As shown in FIG. 1 to FIG. 6, the smoking product bearing assembly 20 comprises a ceramic tube 21 and a blocking piece 22. Wherein the cavity defined by the ceramic tube 21 is suitable for placing the smoking product, and the blocking piece 22 is connected to the ceramic tube 21 and adjacent to the ceramic heating element 10 to limit the position of the smoking product.

Figure 3:
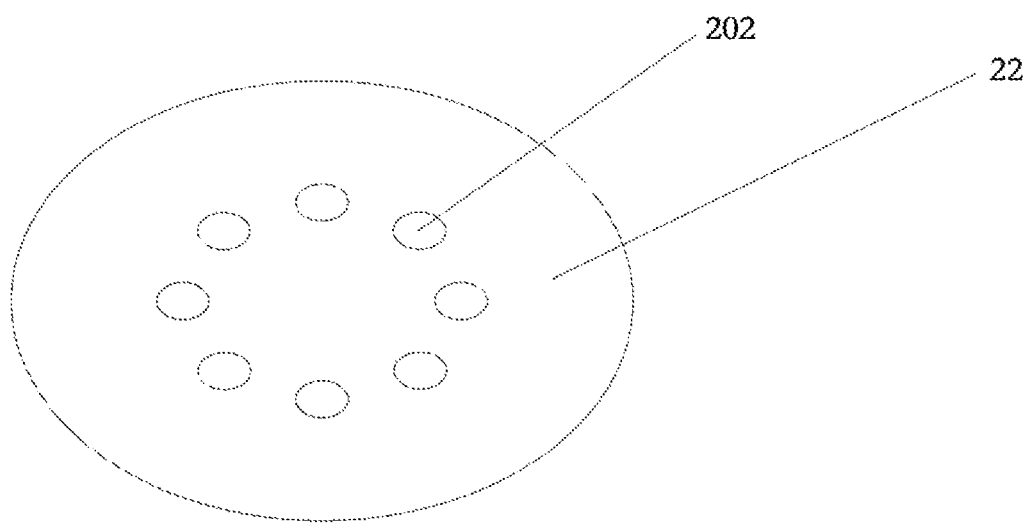
FIG. 3 is a schematic diagram of a flow deflector of an embodiment of the present invention.
Figure 4:
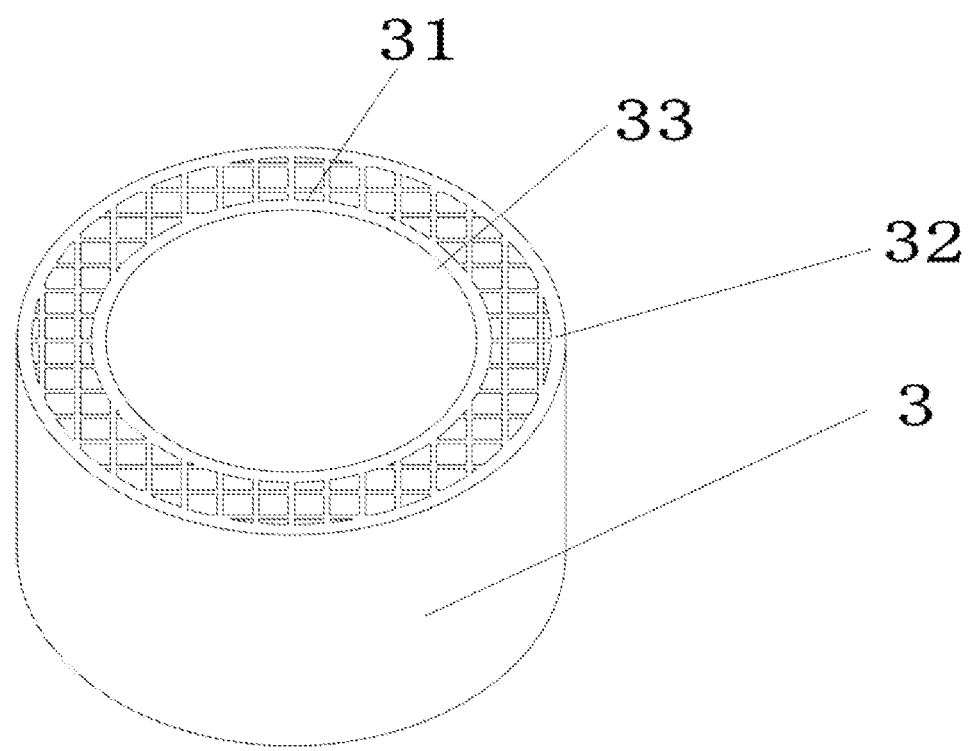
FIG. 4 is a schematic diagram of a heat recovery device of an embodiment of the present invention.
Figure 5:
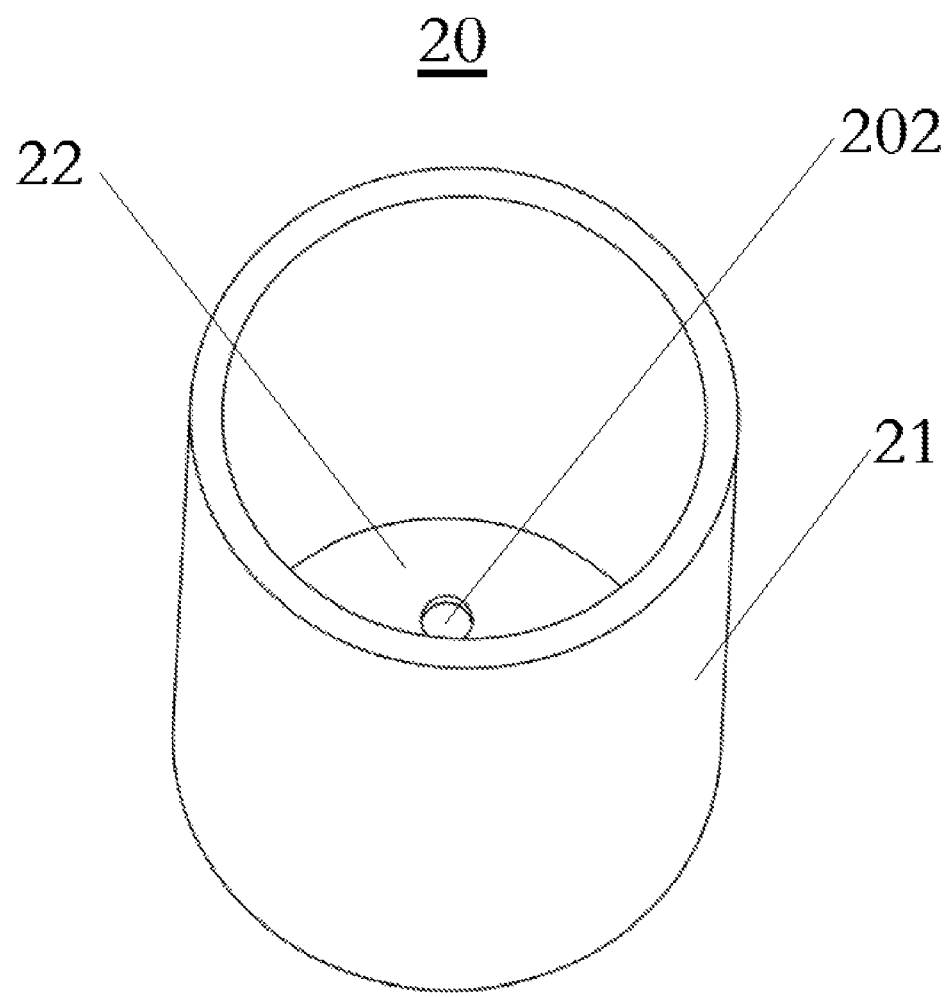
FIG. 5 is a structure diagram of a smoking product bearing assembly of an embodiment of the present invention.

Optionally, as shown FIG. 1, FIG. 3 and FIG. 5, the blocking piece 22 can be a flow deflector located on an opening at one end of the ceramic tube 21 and forming a cup body with the ceramic tube 21, and the flow deflector is provided with a plurality of deflector holes 202.

Further, as shown in FIG. 1 or FIG. 3, the plurality of deflector holes 202 are evenly distributed in the peripheral direction.

Specifically, in an example, as shown in FIG. 1 or FIG. 3, the deflector holes 202 are round holes with the hole diameter of 0.1-2 mm.

In this way, when the ceramic heating element 10 performs heating work, the flow deflector separates the ceramic heating element 10 from the smoking product, which can effectively prevent the ceramic heating element 10 from being in direct contact with the smoking product or being too close to the smoking product to further prevent the part of the smoking product close the ceramic heating element from being heated to be over 320° C. and burnt. Further, when a user smokes the smoking product, the hot air can flow into the cavity quickly through hot air through holes, that is, the deflector holes 202 to bake the smoking product evenly and quickly.

Figure 6:
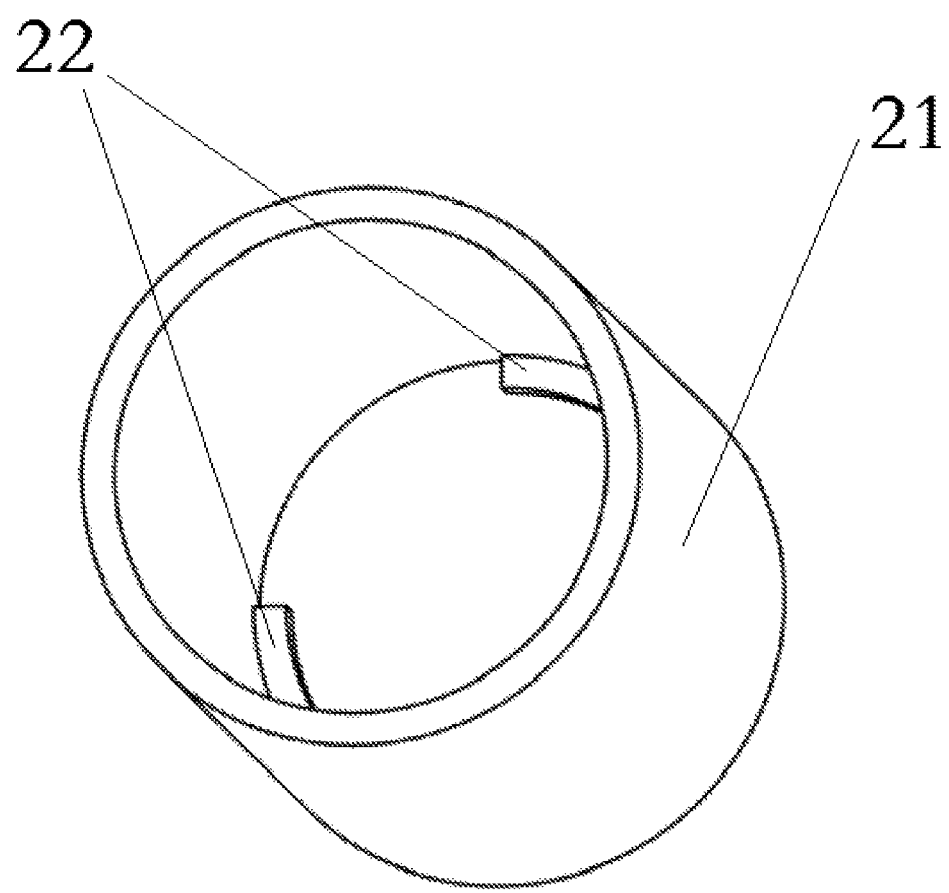
FIG. 6 is a structure diagram of a smoking product bearing assembly of another embodiment of the present invention.

Optionally, in another embodiment, as shown in FIG. 6, the blocking piece 22 forms a step surface extending along the wall of the ceramic tube 21 to the center.

Specifically, as shown in FIG. 6, two blocking pieces 22 can be provided, and the two blocking pieces 22 are arranged oppositely to separate the ceramic heating element 10 from the smoking product effectively and further effectively prevent the ceramic heating element 10 from being in direct contact with the smoking product or being too close to the smoking product to further prevent the part of the smoking product close to the ceramic heating element from being heated to be over 320° C. and burnt. Further, when the user smokes the smoking product, the hot air can flow into the cavity quickly through the gap between the two blocking pieces to bake the smoking product evenly and quickly.

Optionally, according to an embodiment of the present invention, the ceramic tube 21 is made of the aluminum oxide ceramics, the aluminum nitride ceramics, the silicon nitride ceramics, the silicon carbide ceramics, the beryllium oxide ceramics or the zirconium oxide ceramics.

Further, the flow deflector can also be made of the aluminum oxide ceramics, the aluminum nitride ceramics, the silicon nitride ceramics, the silicon carbide ceramics, the beryllium oxide ceramics or the zirconium oxide ceramics.

Wherein, the aluminum oxide content in the aluminum oxide ceramics is greater than 99%, and the density of the aluminum oxide ceramics is not less than 3.86 g/cm$^3$.

In the embodiment of the present invention, the purity of the aluminum oxide ceramics is greater than 99%, so that the ceramic surface has very high compactness, adsorption of the smoke particles can be effectively prevented, and the effect of preventing peculiar smell can be achieved. Further, the aluminum oxide ceramics have good thermal conductivity, up to 33 W/MK, so that the heating efficiency is high, and air temperature rise in the cavity can be achieved more quickly.

Meanwhile, the aluminum oxide ceramic tube 21 does not serve as a heating component, which can reduce the heat loss. In addition, on one hand, the hot air through holes adopted can facilitate circulation of hot air; on the other hand, it also prevents direct diffusion of the hot air when there is no smoking action. The heat insulation effect is achieved.

Based on deep research on the ceramic heating element and the smoking product bearing assembly 20, the inventor of the present invention finds that, in the smoking product of the current common heat-not-burn product, the carbonization temperature of cigarette paper wrapped outside is less than that of the cut tobacco inside; and when the temperature of the cigarette paper wrapped outside the smoking product exceeds 240° C., there will be burnt smell, while the cut tobacco inside needs to be baked at about 330° C. to emit smoke effectively. This requires to achieve the effect that the tobacco paper is not over-baked when the cut tobacco is heated to the ideal temperature. Further, the inventor finds through experiments that better use experiences will be achieved during actual smoking if the entire smoking product has the ideal preparation temperature, like 200~220° C.

For this purpose, when the heat-not-burn heating device scheme where the smoking product is not in direct contact with the ceramic heating element is adopted, the smoking product bearing assembly 20 is required to provide the preparation temperature of 200-220° C. According to many experiments, as a smoking product container, the aluminum oxide ceramic tube can not only effectively provide the ideal preparation temperature for the smoking product through the high thermal conductivity of the aluminum oxide material, but also achieve the effect that no tobacco tar residue is left due to compactness of the material of the aluminum oxide ceramic tube, and peculiar smell caused by continuous use is avoided.

In addition, in order to increase the heating rate, when the ceramic heating element is controlled to perform heating work, the non-contact heat-not-burn heating device of the embodiment of the present invention adopts the heating strategy of adopting high-power pulling up in the initial stage and maintaining the working temperature at low power after reaching the working temperature. Due to the temperature transfer process, the smoking product and the smoking product bearing assembly have not reached the corresponding temperature except for the ceramic heating element that has reached the working temperature. Therefore, while the ceramic heating element is controlled to maintain the working temperature by low-power heating, the voltage cannot be directly reduced to the voltage in the thermal insulation stage but needs to be slowly reduced.

Therefore, when the ceramic heating element is controlled to enter the thermal insulation stage, the voltage reduction process needs to be completed in multiple stages. For example, two-stage voltage reduction is required. In the first stage, the voltage is quickly reduced; in the second stage, the voltage needs to be slowly reduced to the corresponding voltage in the thermal insulation stage to enter the thermal insulation stage maintaining the working temperature. Because the power is much higher than the heat balance power in order to raise the temperature quickly in the early stage. If the voltage reduction is too slow, the temperature of the smoking product can exceed 330° C. easily when the user smokes the smoking product continuously after the first smoking action, leading to scorching of the smoking product. Therefore, the control process of first reducing the voltage quickly and then reducing the voltage slowly can avoid the situation effectively.

To sum up, according to the non-contact heat-not-burn heating device of the embodiment of the present invention, the ceramic heating element and the smoking product bearing assembly are separated in the sealing sleeve, so that the heated flow air can bake the smoking product evenly when the ceramic heating element heats the air, which avoids cut tobacco waste of the smoking product and improves the smoke volume. Meanwhile, due to the fact that the ceramic heating element adopts the high-purity aluminum oxide ceramics which have high compactness and almost have no pores in the micro structure, pollutants in fluids cannot enter the ceramic heating element and thus cannot leave pollution or peculiar smell on the surface. Further, because the smoking product bearing assembly separates the smoking product from the ceramic heating element completely, non-contact air heating is completely achieved to ensure that the product is not polluted. In addition, the ceramic heating element adopts the porous arrangement, so that the specific surface area of the honeycomb ceramic body is large enough to achieve sufficient heating of the air. Not only the heating efficiency is high, but also the ceramic heating body has high thermal conductivity, so that the aim of heating the air can be achieved more quickly. Further, the air flow speed is limited to some extent due to the structure of the porous channel, the contact time between the hot air and the smoking product is longer during baking of the smoking product, the heat loss is reduced, and the energy is saved. Moreover, when no smoking action is performed, the hot air can be locked by means of the porous shape of the ceramic heating body, which reduces outer flow of the hot air and further saves the energy. Furthermore, in the smoking product bearing assembly, the cavity defined by the ceramic tube is used for placing the smoking product, and the blocking piece is used for separating the smoking product placed in the cavity from the ceramic heating element, which prevents the ceramic heating element from being in direct contact with the smoking product or being too close to the smoking product to further effectively prevent the part of the smoking product close to the ceramic heating element from being heated to be over 320° C. and burnt. Further, when a user smokes the smoking product, the hot air flows into the cavity quickly to bake the smoking product evenly and quickly to ensure that the hot air heated by the ceramic heating element bakes the smoking product effectively, the baking efficiency is high, and the smoke volume is sufficient. Due to the fact that the ceramic tube has high surface compactness, adsorption of the smoke particles can be effectively prevented, and the effect of preventing peculiar smell can be achieved.

As shown in FIG. 1 to FIG. 4, the embodiment of the present invention further provides a non-contact air heating type heat-not-burn heating device which comprises a heating assembly 1, a sealing sleeve 30 and a heat recovery device 3, wherein the side wall of the heat recovery device 3 is internally provided with a first cellular porous channel 31, and the first cellular porous channel 31 divides the heat recovery device 3 into an outer wall 32 and an inner wall 33; the inner wall 33 of the heat recovery device 3 is provided with the sealing sleeve 30, the sealing sleeve 30 is internally provided with the heating assembly 1 in the sleeve mode, and the heating assembly 1 is connected to the heat recovery device 3 through the sealing sleeve 30; the heating assembly 1 is internally provided with a heating body 11; and the heating body 11 is provided with a heating circuit 12, the endpoints of the heating circuit 12 are provided with wires 13, and the heating body 11 is internally provided with a second cellular porous channel 101.

Further, the heating assembly 1 is provided with a preheating tube 21, a flow deflector 22 and a heating element 20 sequentially from top to bottom, wherein the flow deflector 22 is provided with a plurality of deflector holes 202.

Further, the heating assembly 1 and the heat recovery device 3 are both made of the high-purity aluminum oxide ceramics with the density not less than 3.86 g/cm$^3$.

Further, the first group of honeycomb porous channels 31 and the second group of honeycomb porous channels 101 are uniformly arranged square holes or other polygonal holes, with a pore diameter ranging from 0.1 mm to 2 mm, and the minimum distance between two adjacent holes within 0.1 mm-0.5 mm Further, printing materials of the heating circuit 12 comprise but not limited to silver, tungsten and MoMn (molybdenum manganese).

Further, the wire 13 material includes but is not limited to silver, copper, and nickel.

In the embodiment, as shown in FIG. 1, the side wall of the heat recovery device 3 is internally provided with the first cellular porous channel 31, and the first cellular porous channel 31 divides the heat recovery device 3 into the outer wall 32 and the inner wall 33; the inner wall 33 of the heat recovery device 3 is provided with the sealing sleeve 30, the sealing sleeve 30 is internally provided with the heating assembly 1 in the sleeve mode, and the heating assembly 1 is connected to the heat recovery device 3 through the sealing sleeve 30; and the heating assembly 1 is internally provided with the preheating tube 21, the flow deflector 22 and the heating body 11 sequentially from top to bottom, as shown in FIG. 2, the heating body 11 is provided with the heating circuit 12, the endpoints of the heating circuit 12 are provided with the wires 13, and the heating body 11 is internally provided with the second cellular porous channel 101. When needing to smoke, the user places the smoking product (like the cartridge) into the preheating tube 21 to prevent the cartridge from falling off, and the heating circuit 12 starts to heat after powered on. Only after the cartridge is baked at 280° C.-320° C., the effective ingredients like the nicotine can be emitted, that is, the smoke for smoking can be produced, so the device needs to be preheated. The preheating is completed after the temperature of the preheating tube 21 and the flow deflector 22 reaches 200° C. Due to the fact that the preheating has completed, the cartridge only needs to be heated from 200° C. to 320° C. during the first and second smoking, that is, the first heating, more quickly than temperature increase from the room temperature, and the smoke volume and the first and second smoking can be further ensured. In order to achieve rapid heating, the heating body 11 is internally provided with the second cellular porous channel 101, and the porous channel is provided with the square holes or other polygonal holes evenly distributed with the hole diameter range of 0.1-2 mm and the minimum distance between two adjacent holes of 0.1-0.5 mm. The expansion area is large, so the air heating efficiency is very high. In addition, the hot air flows through the honeycomb center without contact with the heating circuit 12, and no pollution will be caused. Meanwhile, the heating assembly 1 and the heat recovery device 3 are both made of the high-purity aluminum oxide ceramics with good insulation, high strength and good thermal conductivity, therefore, the heating element 20 has no electric leakage during heating, and the preheating tube 21 and the flow deflector 22 can be rapidly heated due to good thermal conductivity of the high-purity aluminum oxide ceramics, and the user does not have to wait long to smoke the cartridge. When the user smokes the cartridge, the airflow is heated to 320° C. through the heating element 20 and then passes through the deflector holes 202 in the flow deflector 22 to be further homogenized and shunted to flow into the cartridge more evenly to heat the cut tobacco to improve the smoke volume. In the heating process, all the heat not acting on the cartridge will be recovered. Due to the fact that the inner wall 33 of the heat recovery device 3 is provided with the sealing sleeve 30, and the sealing sleeve 30 is internally provided with the heating assembly 1 in the sleeve mode, the heat produced by the heating assembly 1 and not acting on the cartridge will be transferred to the first cellular porous channel 31. In addition, the porous channel is provided with the square holes or other polygonal holes evenly distributed with the hole diameter range of 0.1-2 mm and the minimum distance between two adjacent holes of 0.1-0.5 mm, the expansion area is large, so the heating efficiency is very high, the thermal insulation effect can be achieved, and the energy saving can be achieved by reducing the heating time. During the smoking process, the heated air flows to the second cellular porous channel 101, the air flows into the heat recovery device 3 to further take away the heat in the first cellular porous channel 31 to achieve heat recovery. The sealing sleeve 30 achieves the sealing effect between the heat recovery device 3 and the heating assembly 1, ensuring that the hot air does not flow to other places. During smoking, some fluid contaminants emitted from the cartridge may inevitably remain in the device. As the high-purity alumina ceramics feature high density (not less than 3.86 g/cm$^3$) and almost have no pores in microstructure, so penetration of contaminants in smoke is impossible, and no pollution and odd smell will be left on the surface;

In the description of the present invention, it should be understood that orientation or position relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise" etc. are orientation or position relationships as shown in the drawings, and these terms are just utilized to facilitate description of the present invention and simplify the description, but not to indicate or imply that the mentioned device or component must have a specific orientation and must be established and operated in a specific orientation, and thus, these terms cannot be understood as a limitation to the present invention.

In addition, the terms "first" and "second" are used only for the purpose of description and are not intended to indicate or imply relative importance or imply the number of technical characteristics indicated. Thus, a characteristic defined by "first" and "second" can comprise one or a plurality of characteristics explicitly or implicitly. In the description of the present invention, "a plurality of" means two or more, unless otherwise expressly and specifically defined.

In the present invention, unless otherwise specified and defined, the terms "installed", "connected", "connected with" and "fixed" should be comprehended in a broad sense. For example, these terms may be comprehended as being fixedly connected, detachably connected or integrally connected; mechanically connected or electrically connected; directly connected or indirectly connected through an intermediate medium, and in an internal communication between two components or in an interactive relationship between two components. A person of ordinary skill in the art may understand specific meanings of the foregoing terms in the present invention according to specific situations.

In the present invention, unless otherwise specified and defined, the expression that a first characteristic is "above" or "below" a second characteristic may include that the first characteristic and the second characteristic are in direct contact and may also include that the first characteristic and the second characteristic are not in direct contact but in contact through an additional characteristic between them. Furthermore, the expression that the first characteristic is "over", "above" and "on" the second characteristic includes that the first characteristic is right above or at the inclined top of the second characteristic, or just means that the level of the first characteristic is higher than that of the second characteristic. The expression that the first characteristic is "under", "below" and "beneath" the second characteristic includes that the first characteristic is under or at the inclined bottom of the second characteristic, or just means that the level of the first characteristic is lower than that of the second characteristic.

In the description of the specification, description of the reference terms "an embodiment", "some embodiments", "example", "specific example" or "some examples" means that specific characteristics, structures, materials or features described in combination with the embodiment or the example are included in at least one embodiment or example of the present invention. In the specification, indicative expression of the above terms should not be understood as being necessarily specific to the same embodiment or example. Furthermore, the specific characteristics, the structures, the materials or the features described may be combined in the appropriate mode in any one or more embodiments or examples. In addition, those skilled in the art may connect and combine different embodiments or examples described in the specification.

Although the embodiments of the present invention have been shown and described above, it can be understood that the embodiments are exemplary but should not be construed as a limitation on the present invention, the ordinary technician skilled in the art may make changes, modifications, substitutions and variations of the embodiments within the scope of the present invention.

What is claimed is:

1. A non-contact heat-not-burn heating device, comprising a ceramic heating element, a smoking product bearing assembly, and a sealing sleeve,
   wherein the sealing sleeve is arranged in a hollow mode to sleeve the ceramic heating element and the smoking product bearing assembly inside, and the ceramic heating element and the smoking product bearing assembly are mutually separated,
   the ceramic heating element comprises a heating body and a heating circuit, wherein the heating body is cylindrical and internally provided with a porous channel, and the heating circuit is arranged on the heating body to heat air passing through the porous channel; and
   the smoking product bearing assembly comprises a ceramic tube and a blocking piece, wherein a cavity defined by the ceramic tube is configured for placing a smoking product, and the blocking piece is connected to the ceramic tube and adjacent to the ceramic heating element to limit a position of the smoking product.

2. The non-contact heat-not-burn heating device according to claim 1, wherein the heating body is a cylinder, and the porous channel is arranged in the heating body in an axial direction.

3. The non-contact heat-not-burn heating device according to claim 2, wherein the blocking piece is a flow deflector located on an opening at one end of the ceramic tube and forming a cup body with the ceramic tube, and the flow deflector is provided with a plurality of deflector holes.

4. The non-contact heat-not-burn heating device according to claim 2, wherein the blocking piece forms a step surface extending along a wall of the ceramic tube to a center of the ceramic tube.

5. The non-contact heat-not-burn heating device according to claim 1, wherein through holes of the porous channel are round holes or polygonal holes.

6. The non-contact heat-not-burn heating device according to claim 5, wherein the blocking piece is a flow deflector located on an opening at one end of the ceramic tube and forming a cup body with the ceramic tube, and the flow deflector is provided with a plurality of deflector holes.

7. The non-contact heat-not-burn heating device according to claim 5, wherein the blocking piece forms a step surface extending along a wall of the ceramic tube to a center of the ceramic tube.

8. The non-contact heat-not-burn heating device according to claim 1, wherein through holes of the porous channel are regularly distributed in the heating body.

9. The non-contact heat-not-burn heating device according to claim 8, wherein the blocking piece is a flow deflector located on an opening at one end of the ceramic tube and forming a cup body with the ceramic tube, and the flow deflector is provided with a plurality of deflector holes.

10. The non-contact heat-not-burn heating device according to claim 8, wherein the blocking piece forms a step surface extending along a wall of the ceramic tube to a center of the ceramic tube.

11. The non-contact heat-not-burn heating device according to claim 1, wherein the heating circuit is printed on an outer surface of the heating body in a thick film circuit mode.

12. The non-contact heat-not-burn heating device according to claim 11, wherein the blocking piece is a flow deflector located on an opening at one end of the ceramic tube and forming a cup body with the ceramic tube, and the flow deflector is provided with a plurality of deflector holes.

13. The non-contact heat-not-burn heating device according to claim 11, wherein the blocking piece forms a step surface extending along a wall of the ceramic tube to a center of the ceramic tube.

14. The non-contact heat-not-burn heating device according to claim 1, wherein the blocking piece is a flow deflector located on an opening at one end of the ceramic tube and forming a cup body with the ceramic tube, and the flow deflector is provided with a plurality of deflector holes.

15. The non-contact heat-not-burn heating device according to claim 14, wherein the plurality of deflector holes are evenly distributed in a peripheral direction.

16. The non-contact heat-not-burn heating device according to claim 1, wherein the blocking piece forms a step surface extending along a wall of the ceramic tube to a center of the ceramic tube.

17. The non-contact heat-not-burn heating device according to claim 1, wherein the heating body and the ceramic tube are both made of one material selected from the group consisting of aluminum oxide ceramics, aluminum nitride ceramics, silicon nitride ceramics, silicon carbide ceramics, beryllium oxide ceramics, and zirconium oxide ceramics.

18. The non-contact heat-not-burn heating device according to claim 17, wherein an aluminum oxide content in the aluminum oxide ceramics is greater than 99%, and a density of the aluminum oxide ceramics is not less than 3.86 g/cm$^3$.

* * * * *